US008495259B2

(12) United States Patent
Bakke et al.

(10) Patent No.: US 8,495,259 B2
(45) Date of Patent: *Jul. 23, 2013

(54) IMPLEMENTING STORAGE ADAPTER PERFORMANCE OPTIMIZATION WITH HARDWARE CHAINS TO SELECT PERFORMANCE PATH

(75) Inventors: Brian E. Bakke, Rochester, MN (US);
Brian L. Bowles, Rochester, MN (US);
Michael J. Carnevale, Rochester, MN (US); Robert E. Galbraith, Rochester, MN (US); Adrian C. Gerhard, Rochester, MN (US); Murali N. Iyer, Rochester, MN (US); Daniel F. Moertl, Rochester, MN (US); Mark J. Moran, Minneapolis, MN (US); Gowrisankar Radhakrishnan, Rochester, MN (US); Rick A. Weckwerth, Oronoco, MN (US); Donald J. Ziebarth, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 80 days.

This patent is subject to a terminal disclaimer.

(21) Appl. No.: 13/114,291

(22) Filed: May 24, 2011

(65) Prior Publication Data

US 2012/0303886 A1    Nov. 29, 2012

(51) Int. Cl.
*G06F 13/28* (2006.01)
(52) U.S. Cl.
USPC .............................................. 710/22; 710/24
(58) Field of Classification Search
USPC ........................................................ 710/24
See application file for complete search history.

(56) References Cited

U.S. PATENT DOCUMENTS

| 6,324,599 | B1 * | 11/2001 | Zhou et al. ...................... 710/26 |
| 6,684,270 | B1 | 1/2004 | Chmara et al. |
| 7,680,968 | B2 * | 3/2010 | Burton ............................ 710/62 |
| 2004/0162926 | A1 | 8/2004 | Levy |
| 2005/0114561 | A1 * | 5/2005 | Lu et al. .......................... 710/24 |
| 2007/0162637 | A1 | 7/2007 | Mirabeau et al. |
| 2008/0059699 | A1 | 3/2008 | Kubo et al. |
| 2008/0244227 | A1 | 10/2008 | Gee et al. |
| 2008/0263307 | A1 * | 10/2008 | Adachi .......................... 711/171 |

(Continued)

OTHER PUBLICATIONS

IBM; "ServeRAID B5015 SSD Controller is an Enterprise-grade RAID adapter offering the highest performance and data protection optimized for next generation SSDs"; IBM Hardware announcement 110-113; May 18, 2010.

(Continued)

*Primary Examiner* — Ernest Unelus
(74) *Attorney, Agent, or Firm* — Joan Pennington

(57) ABSTRACT

A method and controller for implementing storage adapter performance optimization with a predefined chain of hardware operations configured to implement a particular performance path minimizing hardware and firmware interactions, and a design structure on which the subject controller circuit resides are provided. The controller includes a plurality of hardware engines; and a data store configured to store a plurality of control blocks selectively arranged in one of a plurality of predefined chains. Each predefined chain defines a sequence of operations. Each control block is designed to control a hardware operation in one of the plurality of hardware engines. A resource handle structure is configured to select a predefined chain based upon a particular characteristic of the system. Each predefined chain is configured to implement a particular performance path to maximize performance.

18 Claims, 15 Drawing Sheets

U.S. PATENT DOCUMENTS

2009/0138627 A1* 5/2009 Shah et al. .................. 710/24
2009/0228660 A1 9/2009 Edwards et al.
2010/0199039 A1 8/2010 Bauman et al.
2011/0314186 A1* 12/2011 Go et al. .................. 710/26

OTHER PUBLICATIONS

Laing, C.-et al.; "DS8000 Performance Monitoring and Tuning"; IBM.com/Redbooks; IBM Corporation; Chapters 4-5; pp. 80-85; Mar. 2009.

"Implementing Storage Adapter Performance Optimization With Hardware Accelerators Offloading Firmware for Buffer Allocation and Automatically DMA" by Brian E. Bakke et al., U.S. Appl. No. 13/114,124, filed herewith.

"Implementing Storage Adapter Performance Optimization With Cache Data/Directory Mirroring" by Brian E. Bakke et al., U.S. Appl. No. 13/114,185, filed herewith.

"Implementing Storage Adapter Performance Optimization With Parity Update Footprint Mirroring" by Brian E. Bakke et al., U.S. Appl. No. 13/114,268, filed herewith.

"Implementing Storage Adapter Performance Optimization With Chained Hardware Operations Minimizing Hardware/Firmware Interactions" by Brian E. Bakke et al., U.S. Appl. No. 13/114,107, filed herewith.

"Implementing Storage Adapter Performance Optimization With Chained Hardware Operations and Error Recovery Firmware Path" by Brian E. Bakke et al., U.S. Appl. No. 13/114,354, filed herewith.

"Implementing Storage Adapter Performance Optimization With Enhanced Hardware and Software Interface" by Brian E. Bakke et al., U.S. Appl. No. 13/114,390, filed herewith.

"Implementing Storage Adapter Performance Optimization with Enhanced Resource Pool Allocation" by Brian E. Bakke et al., U.S. Appl. No. 13/114,427, filed herewith.

* cited by examiner

300

| OFFSET 302 | SIZE 304 | | DEFINITION 306 |
|---|---|---|---|
| 000:03F | 256 B | 64B | RESERVED FOR FIRMWARE |
| 040:07F | | 64B | RESERVED |
| 080:0BF | | 64B | HW CB #1  308 |
| 0C0:0FF | | 64B | HW CB #2  308 |
| 100:13F | 256 B | 64B | HW CB #3  308 |
| 140:17F | | 64B | HW CB #4  308 |
| 180:1BF | | 64B | HW CB #5  308 |
| 1C0:1FF | | 64B | HW CB #6  308 |
| 200:23F | 256 B | 64B | HW CB #7  308 |
| 240:27F | | 64B | HW CB #8  308 |
| 280:2BF | | 64B | HW CB #9  308 |
| 2C0:2FF | | 64B | HW CB #10  308 |
| 300:33F | 256 B | 64B | HW CB #11  308 |
| 340:37F | | 64B | HW CB #12  308 |
| 380:3BF | | 64B | HW CB #13  308 |
| 3C0:3FF | | 64B | HW CB #14  308 |
| 400:43F | 256 B | 64B | HW CB #15  308 |
| 440:47F | | 64B | HW CB #16  308 |
| 480:4BF | | 64B | HW CB #17  308 |
| 4C0:4FF | | 64B | THE FIRST 260-BYTES IS USED AS LIST SPACE FOR 65 INDICES ENOUGH TO COVER A 256K DMA THAT IS NOT ALIGNED. IF LIST SPACE IS ELSEWHERE THEN COULD BE USED FOR HW CB. FW WILL USE THE LAST 60-BYTES OF THIS. |
| 500:5FF | 256 B | | |
| 600:7FF | 512B | | RESERVED. COULD BE LIST SPACE OR HW CB. |

- SET/UPDATE/CLEAR/MIRROR FP - F — 308
- SET/CLEAR/MIRROR CL - M — 308
- SEND SAS OP - S — 308
- FREE ALLOCATED PAGES - D — 308
- RUN SOP ENGINE - X — 308
- ALLOCATE PAGES - A — 308
- SEND HDMA OP - H — 308
- COMP/DECOMPRESSION - C — 308

400    308

| BYTE 0 402 | BYTE 1 404 | BYTE 2 406 | BYTE 3 408 | ADR 410 |
|---|---|---|---|---|
| (RESERVED OR DRIVE TAG) | (SELECTIVE WRITE HW EVENT QUEUE ENTRY) | (UPDATE HW EVENT QUEUE & CB ID OF NEXT LINKED) | (CB ID & LINKED, NOT LINKED, FIRST IN CHAIN, LAST IN CHAIN, MIDDLE IN CHAIN) | 00 |

IMPLEMENTING STORAGE ADAPTER PERFORMANCE OPTIMIZATION WITH HARDWARE CHAINS TO SELECT PERFORMANCE PATH

FIELD OF THE INVENTION

The present invention relates generally to the data processing field, and more particularly, relates to a method and controller for implementing storage adapter performance optimization with a predefined chain of hardware operations configured to implement a particular performance path minimizing hardware and firmware interactions, and a design structure on which the subject controller circuit resides.

DESCRIPTION OF THE RELATED ART

Storage adapters are used to connect a host computer system to peripheral storage I/O devices such as hard disk drives, solid state drives, tape drives, compact disk drives, and the like. Currently various high speed system interconnects are to connect the host computer system to the storage adapter and to connect the storage adapter to the storage I/O devices, such as, Peripheral Component Interconnect Express (PCIe), Serial Attach SCSI (SAS), Fibre Channel, and InfiniBand.

For many years now, hard disk drives (HDDs) or spinning drives have been the dominant storage I/O device used for the persistent storage of computer data which requires online access. Recently, solid state drives (SSDs) have become more popular due to their superior performance. Specifically, SSDs are typically capable of performing more I/Os per seconds (IOPS) than HDDs, even if their maximum data rates are not always higher than HDDs.

From a performance point of view, an ideal storage adapter would never be a performance bottleneck to the system. However, in reality storage adapters are often a performance bottleneck to the computer system. One effect of the increasing popularity of SSDs is that the storage adapter is more often the performance bottleneck in the computer system.

A need exists for an effective method and controller for implementing storage adapter performance optimization. A need exists for such method and controller for use with either HDDs or SSDs and that significantly reduces the time required for an I/O operation, while efficiently and effectively maintaining needed functions of the storage adapter for various arrangements of the storage adapter and the storage I/O devices, such as utilizing Write Caching, and Dual Controllers configurations, and redundant array of inexpensive drives (RAID) read and write operations.

As used in the following description and claims, the terms controller and controller circuit should be broadly understood to include an input/output (IO) adapter (IOA) and includes an IO RAID adapter connecting various arrangements of a host computer system and peripheral storage I/O devices including hard disk drives, solid state drives, tape drives, compact disk drives, and the like.

SUMMARY OF THE INVENTION

Principal aspects of the present invention are to provide a method and controller for implementing storage adapter performance optimization with a predefined chain of hardware operations configured to implement a particular performance path minimizing hardware and firmware interactions, and a design structure on which the subject controller circuit resides. Other important aspects of the present invention are to provide such method, controller, and design structure substantially without negative effects and that overcome many of the disadvantages of prior art arrangements.

In brief, a method and controller for implementing storage adapter performance optimization with a predefined chain of hardware operations configured to implement a particular performance path minimizing hardware and firmware interactions, and a design structure on which the subject controller circuit resides are provided. The controller includes a plurality of hardware engines; and a data store configured to store a plurality of control blocks selectively arranged in one of a plurality of predefined chains. Each predefined chain defines a sequence of operations. Each control block is designed to control a hardware operation in one of the plurality of hardware engines. A resource handle structure is configured to select a predefined chain based upon a particular characteristic of the storage system. Each selected predefined chain is configured to select a particular performance path to maximize performance.

In accordance with features of the invention, each predefined chain selection is based upon a plurality of characteristics of the host system and storage devices and system use including for example, a redundant array of inexpensive drives (RAID) level, a particular data and parity layout to support particular device characteristics, a particular host operating system (OS), and a particular caching mode.

In accordance with features of the invention, a respective unique performance path is provided for multiple different read and write operations that include, for example, device read, cache fast write, cache destage, mirrored write, mirrored delete, mirrored set and clear parity update footprints.

In accordance with features of the invention, each performance path is configured for a particular RAID-level, device type such as HDD or SSD, and for a particular host operating system.

In accordance with features of the invention, the predefined chain of the plurality of the control blocks configured to implement a particular performance path is executed minimizing the hardware engines and processor interaction and providing a significant reduction in code path.

BRIEF DESCRIPTION OF THE DRAWINGS

The present invention together with the above and other objects and advantages may best be understood from the following detailed description of the preferred embodiments of the invention illustrated in the drawings, wherein:

FIG. 3A illustrates an example control store (CS) structure including a plurality of sequential control blocks in accordance with the preferred embodiment;

FIG. 4A illustrates an example common header of a control block in accordance with the preferred embodiment;

FIG. 4B illustrates a plurality of example control blocks in accordance with the preferred embodiment;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and controller implement enhanced storage adapter performance and performance optimization with chained hardware operations minimizing hardware and firmware interactions, and a design structure on which the subject controller circuit resides is provided.

Figure 1:
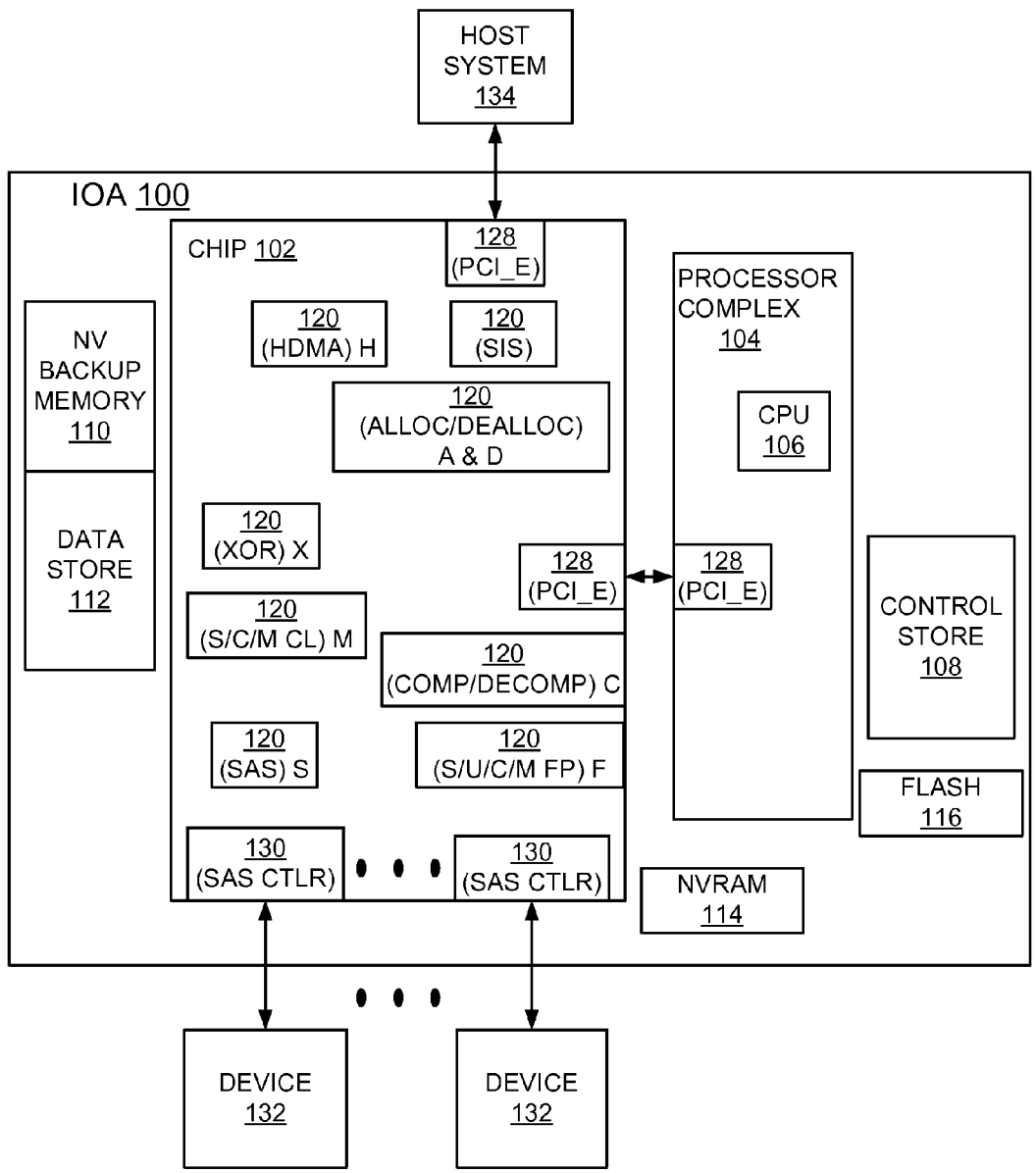
FIG. 1 is a schematic and block diagram illustrating an exemplary system for implementing storage adapter performance optimization with chained hardware operations minimizing hardware and firmware interactions in accordance with the preferred embodiment.

Having reference now to the drawings, in FIG. 1, there is shown an input/output adapter (IOA) or controller in accordance with the preferred embodiment generally designated by the reference character 100. Controller 100 includes a semiconductor chip 102 coupled to at least one processor complex 104 including one or more processors or central processor units (CPUs) 106. Controller 100 includes a control store (CS) 108, such as a dynamic random access memory (DRAM) proximate to the CPU 106 providing control block, work queue and event queue storage. Controller 100 includes a non-volatile (NV) backup memory 110 and a data store (DS) 112 providing data and scratch buffers for control block set up and processing, for example, performed by hardware. Controller 100 includes a non-volatile random access memory (NVRAM) 114, and a flash memory 116.

In accordance with features of the invention, controller 100 implements methods that uniquely chains together hardware operations in order to minimize hardware/firmware interactions in order to maximize performance. The hardware (HW) chaining is completely heterogeneous; asynchronous, not requiring synchronization or defined timed slots for operations; fully free form with any HW engine chained to any HW engine, and operational policy in FW dispatching at HW speeds.

Controller semiconductor chip 102 includes a plurality of hardware engines 120, such as, a hardware direct memory access (HDMA) engine 120, a SIS engine 120, an allocate and de-allocate engine 120, an XOR or sum of products (SOP) engine 120, a Serial Attach SCSI (SAS) engine 120, a set/update/clear/mirror footprint (S/U/C/M FP) engine 120, and a compression/decompression (COMP/DECOMP) engine 120.

In accordance with features of the invention, substantial conventional firmware function is moved to HW operations performed by the hardware engines 120. The hardware engines 120 are completely heterogeneous, and are fully extensible with chaining any engine to any other engine enabled.

As shown, controller semiconductor chip 102 includes a respective Peripheral Component Interconnect Express (PCIe) interface 128 with a PCIe high speed system interconnect between the controller semiconductor chip 102 and the processor complex 104, and a Serial Attach SCSI (SAS) controller 130 with a SAS high speed system interconnect between the controller semiconductor chip 102 and each of a plurality of storage devices 132, such as hard disk drives (HDDs) or spinning drives 132, and solid state drives (SSDs) 132. A host system 134 is connected to the controller 100 with a PCIe high speed system interconnect.

DS 112, for example, 8 GB of DRAM, stores volatile or non-volatile pages of Data, such as 4 KB page of Data or 8*528-bytes usable data or 64 CAS access (66-bytes), 32-byte cache line (CL) with one CL for each non-volatile page of the write cache in a contiguous area of DS and 32-byte parity update footprint (PUFP) in a contiguous area of DS after the CL area.

Figure 3B:
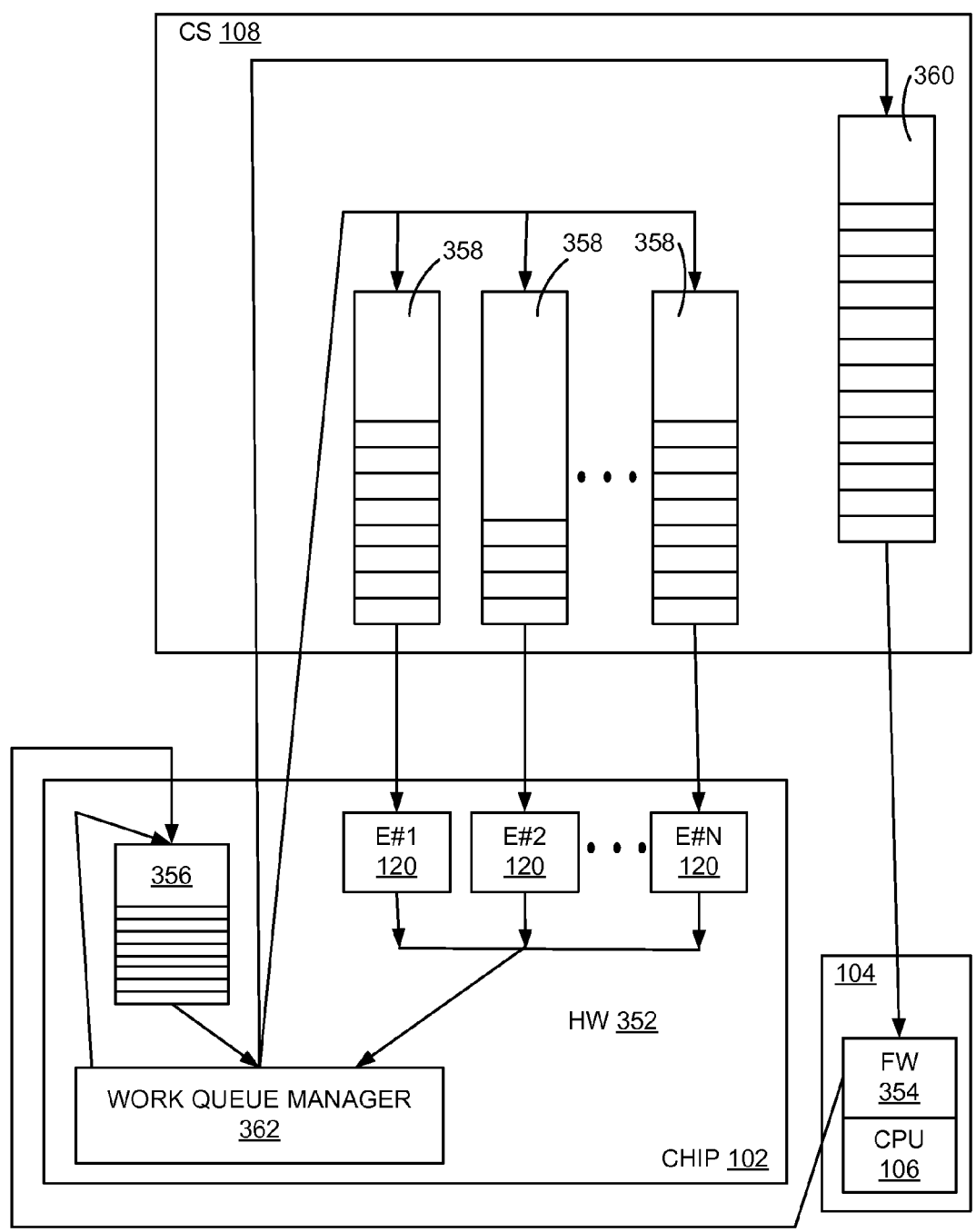
FIG. 3B illustrates an enhanced hardware (HW) and firmware (FW) interface including a plurality of example hardware (HW) Work Queues and a HW Event Queue stored in the control store (CS) in accordance with the preferred embodiment.

The control store (CS) 108 stores other structures and control blocks, such as illustrated and described with respect to FIGS. 3A and 3B, and FIGS. 4A and 4B. The control store (CS) 108 includes a control block (CB) buffer area, such as 8 MB size and 8 MB alignment, a HW Event Queue, such as 4 MB size and 4 MB alignment, providing 1 M entries of 4B each, SIS SEND Queue, such as 64 KB size and 64 KB alignment, providing 4K entries of 16B each, Index Free List Volatile and Index Free List Non-Volatile, each such as 4 MB size and 4 MB alignment, providing 1 M entries of 4B each, HW Work Queues (WQ), such as 512 KB size and 512 KB alignment, providing 32 WQ of 16 KB each. Other structures in the CS 108 include Page Table Index Lists, such as 4B, 1-N entries of 4B each, which can be anywhere in the 256 MB space and are often within the 8 MB CS buffer area, CS target Buffers of 128B alignment, where each buffer is 1 KB, and can be anywhere in the 256 MB space, and HW CB of 64B alignment, which are within the 8 MB CS buffer area, such as illustrated in FIG. 3A.

Figure 2A:
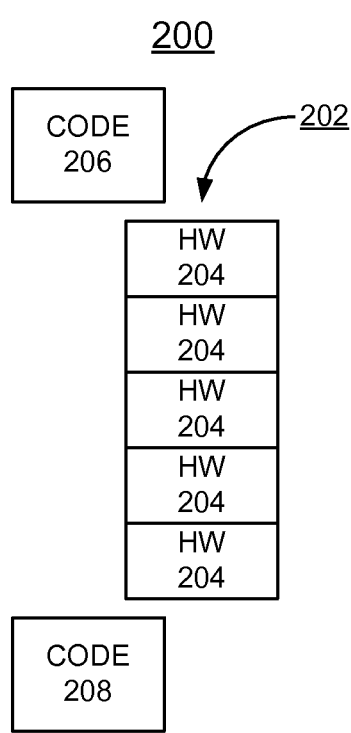
FIG. 2A illustrates example chained hardware operations minimizing hardware and firmware interactions in accordance with the preferred embodiment.

Referring to FIG. 2A, there are shown example chained hardware operations minimizing hardware and firmware interactions in accordance with the preferred embodiment generally designated by the reference character 200. The chained hardware operations 200 include a chain 202 of a plurality of sequential operations by hardware (HW) 204 with an initial interaction with code or firmware (FW) 206 at the initial setup and another interaction with FW 208 at the completion of the series or chain 202 of operations by HW 204.

In accordance with features of the invention, the types of chained operations include Buffer Allocate, Buffer Deallocate, SAS Read-XOR, SAS Write, and Setting Parity Update Footprint (PUFP). Clearing PUFP, Mirrored write of a PUFP to a remote adapter, Mirrored write of cache data to remote adapter, and the like. For example, the following is an example of chained operations for a RAID-5 write: a) Buffer allocate, b) Read-XOR of data, c) Setting of PUFP, d) Write of data, e) Update parity footprint, f) Read-XOR of parity, g) Write of parity, h) Clearing of PUFP, and i) Buffer deallocate.

Figure 2B:
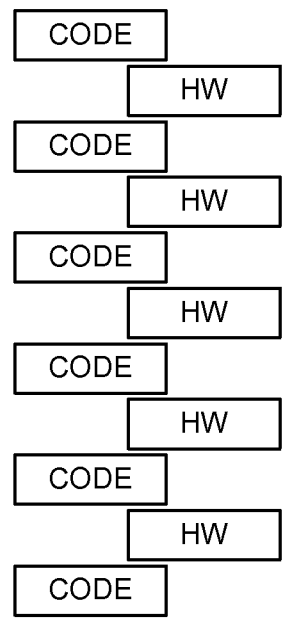
FIG. 2B illustrates conventional prior art storage adapter hardware and firmware interactions.

FIG. 2B illustrates conventional prior art storage adapter hardware and firmware interactions that includes a code or firmware (FW) and hardware interaction with each of multiple IOA operations. As shown in FIG. 2A, the chained hardware operations 200 of the invention, significantly reduces the firmware path length required for an I/O operation. The chained hardware operations 200 of the invention are arranged to minimize hardware/firmware interactions in order to maximize performance.

Referring to FIG. 3A, there is shown an example control store (CS) structure generally designated by the reference character 300 in accordance with the preferred embodiment. CS structure 300 includes predefined fields including an offset 302, size 304, and definition 306. CS structure 300 includes a plurality of sequential control blocks (HW CB) #1-17, 308, for example, which are selectively arranged in a predefined chain to minimize hardware and firmware interaction, such as to minimize the hardware engines 120 writing event queue entries to the processor complex 104.

In accordance with features of the invention, each predefined chain includes sequential control blocks 308 stored within contiguous memory in CS 108, as illustrated in FIG. 3A. Each predefined chain defines controls applied to respective hardware engines 120. Each control block 308 can be linked to any other control block 308 defining a predefined chain of operations. For example, each buffer in CS structure 300 is 2 KB in size. FW gives these buffers to HW by writing CS Indices to the Global Hardware (HW) Work Queue. HW returns to FW by writing to the HW Event Queue, as illustrated and described with respect to FIG. 3B.

Referring to FIG. 3B, there is shown an enhanced hardware (HW) and firmware (FW) interface generally designated by the reference character 350 in accordance with the preferred embodiment. The HW/FW interface 350 includes a HW block 352 including the plurality of HW engines 120 in the controller chip 102 and a firmware block 354 provided with the CPU 106 in the processor complex 104. The HW/FW interface 350 includes a global hardware (HW) Work Queue 356, such as a small embedded array in the controller chip 102. The global HW Work Queue 356 is coupled to each of a plurality of hardware (HW) Work Queues 358.

Each of the plurality of hardware (HW) Work Queues 358 is applied to respective hardware engines 1-N, 120 within the chip 102. A HW Event Queue 360 is coupled to firmware (FW) 354 providing completion results to the processor complex 104. A Work Queue Manager 362 in the controller chip 102 is coupled to each of the plurality of hardware (HW) Work Queues 358 and hardware engines 1-N, 120, and to the HW Event Queue 360. The global HW work queue 356 includes a queue input coupled to FW 354 in the processor complex 104 and a queue input coupled to the Work Queue Manager 362 in the controller chip 102. The Work Queue Manager 362 and the global HW work queue 356 provide an input to the HW Event Queue 360. The HW Work Queues 358, and the HW Event Queue 360 are stored in the control store (CS) 108.

The hardware engines 120 are arranged to DMA data from the host system 134 to the controller 100. The HDMA engine 120 DMAs the data from host system 134 to the CS 108 or DS 112, then notifies FW via the HW Event Queue 360. The hardware engines 120 are arranged to run some functions in parallel, such as 8 or 12 SAS engines 120, 4 host DMA engines 120, and the like. The hardware engines 120 are arranged to run multiple operations on different steps of the same function, such as an HDMA engine 120 fetches data from the host system 134 at the same time that another HDMA engine 120 is DMAing other data to the host system 134.

In accordance with features of the invention, each control block 308 includes a common header including a control block ID, a chain position, and a next control block ID. The control block chain position identifies a first in chain, a last in chain, middle in linked chain, or stand alone. The common header includes a predefined hardware event queue entry selectively written when the control block completes. The predefined hardware event queue entry is written when a stand alone control block completes and the last in chain control block completes. The predefined hardware event queue entry is written when control block fails with an error.

Referring also to FIG. 4A, there is shown an example common header generally designated by the reference character 400 of the control block 308 in accordance with the preferred embodiment. Each control block header 400 includes a byte 0, 402, for example, reserved or drive tag.

Each control block header 400 includes a byte 1, 404 including for example, a selective write HW Event Queue entry. The predefined hardware event queue entry 404 is selectively written when the control block completes. The predefined hardware event queue entry 404 is written when a stand alone control block completes or a last in chain control block completes. The predefined hardware event queue entry 404 is written when control block fails with an error.

Each control block header 400 includes a byte 2, 406 including an update HW Event Queue entry and a next control block engine identification (ID) 406. The HW Event Queue 360 shown in FIG. 3B is a circular first-in first-out (FIFO) in the CS 108. The HW Event Queue 360 is aligned on a 4M-byte address boundary, and is 4M-bytes in size. This size allows the queue to be a history of the last 1 M events. HW writes 4-byte entries 406 to the HW Event Queue for each event. FW periodically reads and removes the entries from the HW Event Queue.

Each control block header 400 includes a byte 3, 408, including a control block engine ID and a chain position 408, and includes a header address (ADR) 410. The control block chain position 408 identifies a first in chain, a last in chain, middle in linked chain, or stand alone control block chain position.

Chained or stand alone CB execution begins when an entry is removed from the Global HW Work Queue 356 and dispatched by the Work Queue Manager 362 to one of the HW Work Queues 358 coupled to one of the Hardware Engines 120. Hardware Engines 120 in FIG. 3B can execute a chain of control blocks, HW CB #1-17, 308, as shown in FIG. 3A and further illustrated in FIGS. 4A, and 4B. The HW CB 308 links to the next operation in the predefined chain when the current engine 120 completes execution of its operation in the predefined chain. The mechanism for the next HW CB 308 in a respective predefined chain to eventually start execution is initiated by the respective hardware engine 120. The hardware engine 120 when completing execution of its HW CB 308 in the chain, adds 64 to its current CB address in CS 108, which then forms a new CB address in CS 108 that maps directly to the next 64 byte Offset 302 in the chain shown in FIG. 3A. This new CB address, together with the CB ID Next Linked field 406, is given to the Work Queue Manager 362 by hardware engine 120. The Work Queue Manager 362 then adds a new entry to Global HW WQ 356. The next CB in the predefined chain will then execute when this entry is removed from the Global HW WQ 356 and dispatched to one of the HW Work Queues 358.

Referring to FIG. 4B, there are shown a plurality of example control blocks in accordance with the preferred embodiment. The control blocks 308 include:
Set/Update/Clear/Mirror FP (Footprint) —F,
Set/Clear/Mirror CL—M,
Send SAS Op—S,
Free Allocated Pages—D,
Run SOP Engine—X,
Allocate Pages—A,
Send HDMA Op—H, and
Comp/Decompression—C.

With the Set/Update/Clear/Mirror FP (Footprint)—F control block 308, CS actions performed by HW or S/U/C/M FP engine 120 include for example, Read 32 Bytes from CS 108, for Set, for each 4K, Read 32 Bytes, Write 32 Bytes to DS 112 and Write 32 Bytes to NVRAM 114, and optionally minor to remote controller; for Update, Read 32 Bytes from CS 108 or DS 112, Write 32 Bytes to DS 112 and Write 32 Bytes to NVRAM 114, and optionally minor to remote controller; and for Clear, Write 32 Bytes to DS 112 and Write 32 Bytes to NVRAM 114, and optionally minor to remote controller.

With the Set/Clear/Mirror CL—M control block 308, CS actions performed by HW or S/C/M CL engine 120 include for example, Read 32 Bytes from CS 108, for Set, for each 4K, Read 32 Bytes, Write 32 Bytes to DS 112 and For each 4K, Read 4 byte index, and may read 4K from DS 112 and optionally minor to remote controller; and for Clear, For each 4K, Read 4 byte index, and Write 32 Bytes to DS 112 and optionally mirror to remote controller.

With the Send SAS Op—S control block 308 and the Send HDMA Op—H, CS actions performed by HW or the respective SAS engine 120 and the HDMA engine 120 include for example, For each 4K, SAS engine 120 and the HDMA engine 120 Read 4 byte index, and HDMA engine 120 will Read or Write 4K to DS 112, and SAS engine 120 may read and write 4K to DS 112. The HDMA engine 120 moves data between DS 112 and the host system 134, and the SAS engine 120 moves data between DS 112, and the storage devices 132.

With the Free Allocated Pages—D and the Allocate pages—A control blocks 308, CS actions performed by HW or the Alloc/Dealloc engine 120 include for example, for each 4K, Read 4 Bytes, and Write 4 Bytes.

With the Run SOP Engine—X control block 308, CS actions performed by HW or the XOR engine 120 include for example, For each 4K of Source (for each source), Read 4 Bytes, and Read 4K of DS 112; and For each 4K of Destination (for each destination), Read 4 Bytes, and Write 4K of DS 112. The sum-of-products (SOP) engine 120 takes an input of 0-N source page lists and 0-M destination page lists as well as an N×M array of multipliers. For example, N=18 and M=2. For each 4K, the first source page is read from DRAM and the first set of M multipliers are applied to each byte. The resulting data is put into M on chip accumulation buffers. Each subsequent source page is multiplied by its associated M multipliers and the product XORed with the corresponding accumulation buffers. When every source has been processed, the accumulation buffers are written out to the corresponding M destination buffers. Then, the next 4K is started. This allows computing an N input XOR to compute RAID-5 parity or N input multiply XOR of M equations simultaneously for Reed-Solomon based RAID-6 P & Q redundancy data.

With the Comp/Decompression—C control block 308, CS actions performed by HW or the Comp/Decomp engine 120 include for example, For each logical 4K (compressed data may be <4K), Read 4 Bytes, and Read 4K of DS 112 (or less if doing decompression), Read 4 Bytes, and Write 4K of DS 112 (or less if doing compression), and optionally other operations may be performed.

Figure 5A:
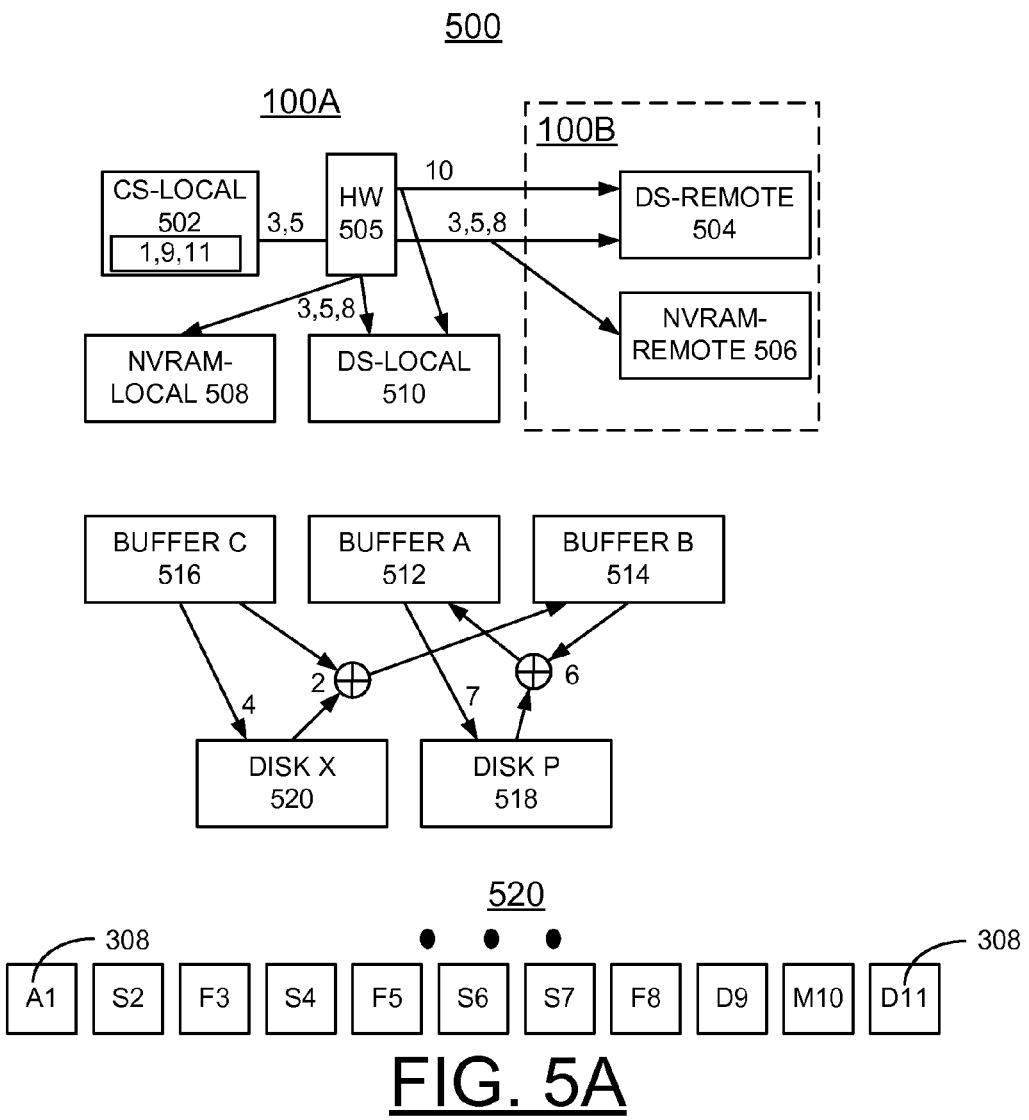
FIGS. 5A and 5B are hardware logic operations flow and flow chart illustrating exemplary operations performed by a predefined chain of a plurality of the control blocks selectively arranged to implement an example RAID-5 normal parity update in accordance with the preferred embodiment.
Figure 6A:
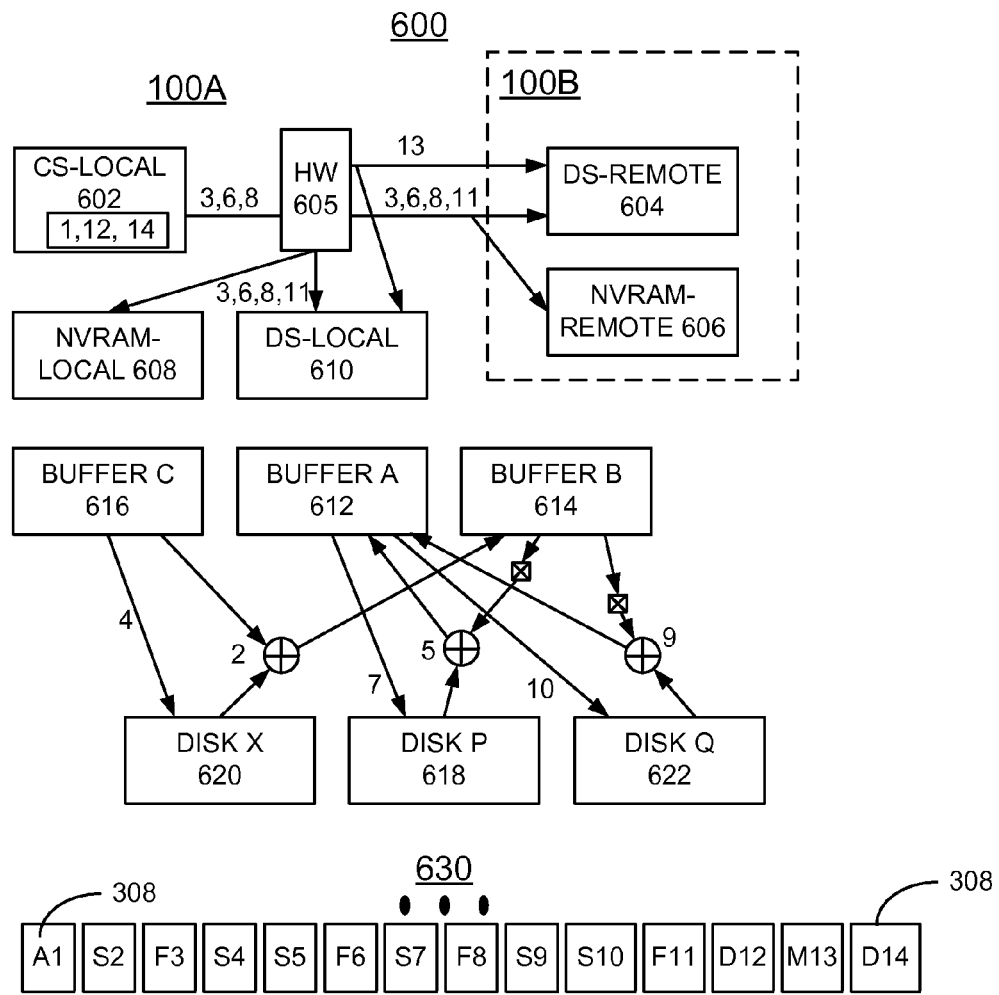
FIGS. 6A and 6B are hardware logic operations flow and flow chart illustrating exemplary operations performed by a predefined chain of a plurality of the control blocks selectively arranged to implement an example RAID-6 normal parity update in accordance with the preferred embodiment.
Figure 7A:
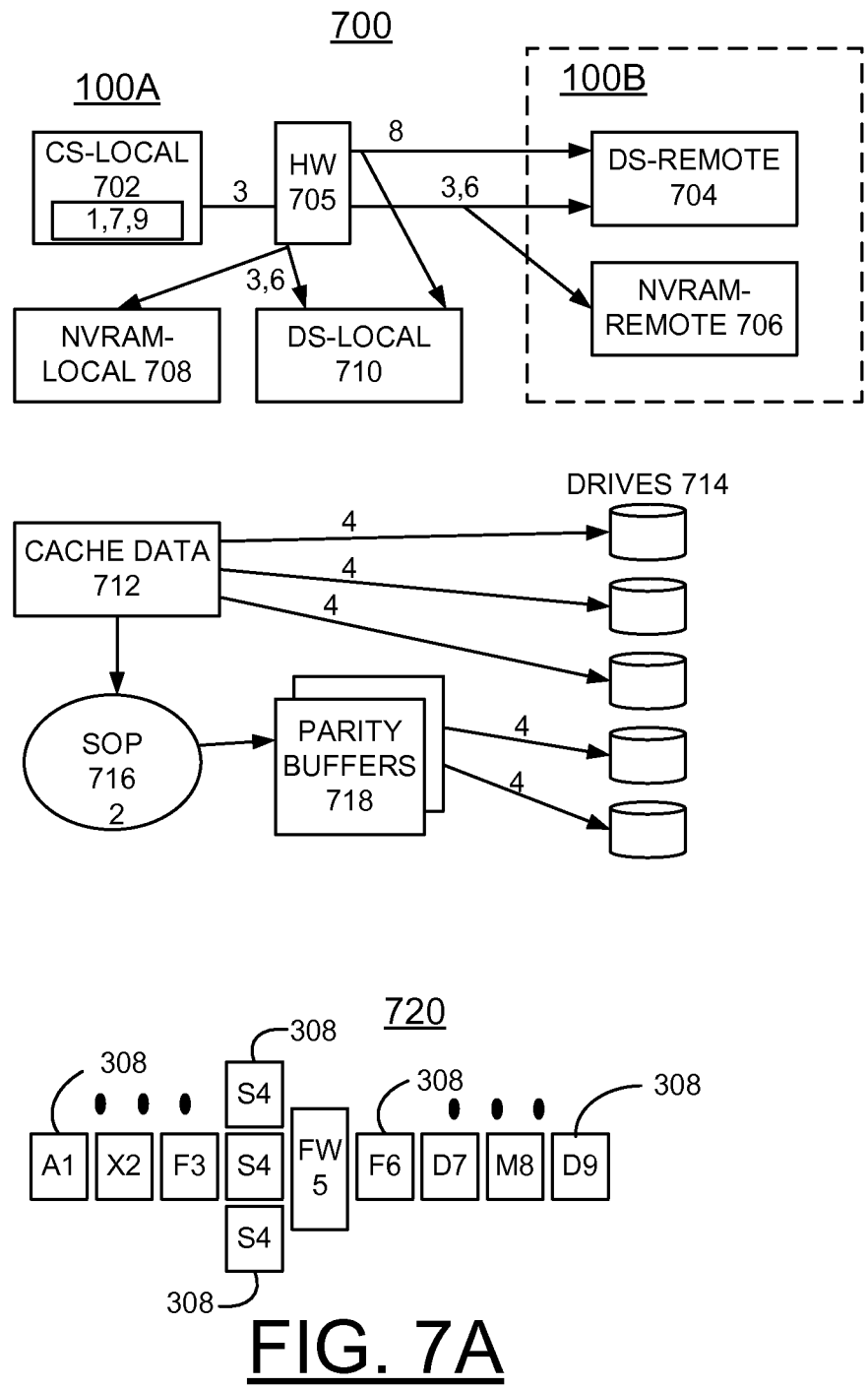
FIGS. 7A and 7B are hardware logic operations flow and flow chart illustrating exemplary operations performed by a pair of predefined chains of a plurality of the control blocks selectively arranged to implement an example RAID-5/6 stripe write with cache in accordance with the preferred embodiment.

A respective example chain of control blocks 308 is illustrated and described with respect to each of FIGS. 5A, 6A, and 7A in accordance with the preferred embodiment.

Figure 5B:
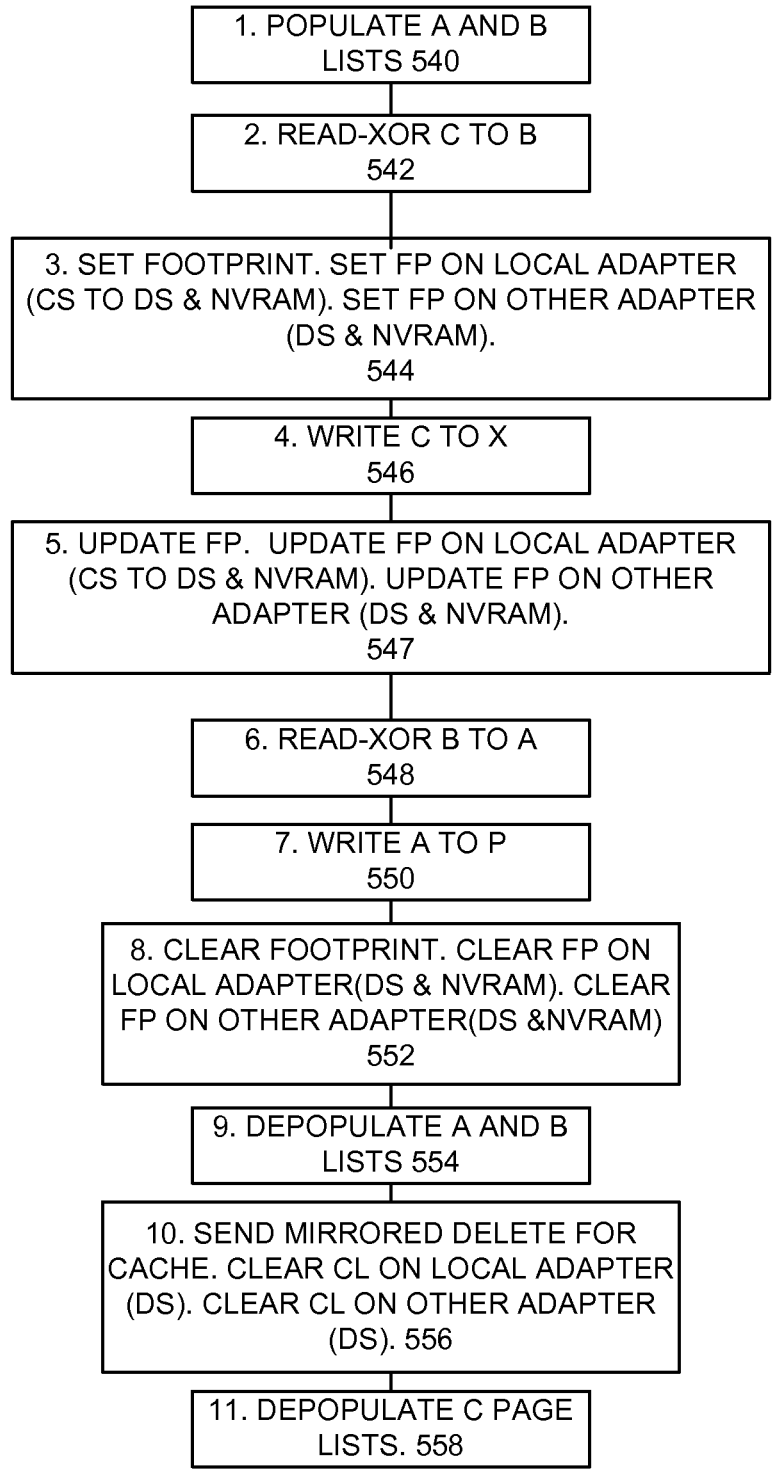

Referring to FIGS. 5A and 5B, there are shown hardware logic operations flow generally designated by the reference character 500 and a flow chart in FIG. 5B illustrating exemplary operations performed by a predefined chain generally designated by the reference character 520 of a plurality of the control blocks selectively arranged to implement an example RAID-5 normal parity update in accordance with the preferred embodiment. In FIG. 5A, the chain 520 of control block 308 include control blocks A1, S2, F3, S4, F5, S6, S7, F8, D9, M10, and D11, as defined in FIG. 4B together with the respective steps 1-11 shown in FIGS. 5A and 5B.

FIG. 5A includes a local CS 502 of a first or local controller 100A coupled by a HW engine 505 to a remote DS 504 and to a remote NVRAM 506 of a second or remote controller 100B. The local CS 502 is coupled by the HW engine 505 to a local NVRAM 508, and a local DS 510 of the first controller 100A. A plurality of buffers of a first controller 100A including buffer A, 512, buffer B, 514, and buffer C, 516, are coupled to a disk P 518 and a disk X 520.

In step 1, A and B lists for Buffer A, 512, and Buffer B, 514 are allocated or populated at control block A1 of chain 520, in CS local 502 in FIG. 5A, and as indicated at a block 540 in FIG. 5B. Next in Step 2, Data is read from Disk X 520, and XORed with Buffer C, 516 and the result is placed in Buffer B, 514 at control block S2 of chain 520, at 2 XOR in FIG. 5A, and as indicated at a block 542 in FIG. 5B. In step 3, set footprint is performed at control block F3 of chain 520, read by HW engine 505, line 3 from HW engine 505 to DS 510 and NVRAM 508 on the local controller 100A and set footprint on the remote controller 100B from HW engine 505 to DS 504 and NVRAM 506 in FIG. 5A, and as indicated at a block 544 in FIG. 5B.

In step 4, Write data from Buffer C, 516 to Disk X 520 is performed at control block S4 of chain 520, line 4 from Buffer C, 516 to Disk X 520 in FIG. 5A, and as indicated at a block 546 in FIG. 5B. Next in Step 5, update footprint is performed at control block F5 of chain 520, read by HW engine 505, line 5 from HW engine 505 to DS 510 and NVRAM 508 on the local controller 100A and update footprint on the remote controller 100B from HW engine 505 to DS 504 and NVRAM 506 in FIG. 5A, and as indicated at a block 547 in FIG. 5B. Next in Step 6, Data is read from Disk P 518, and XORed with Buffer B, 514 and the result is placed in Buffer A, 512 at control block S6 of chain 520, at 6 XOR in FIG. 5A, and as indicated at a block 548 in FIG. 5B. Next in Step 7, Write data from Buffer A, 512 to Disk P 518 is performed at control block S7 of chain 520, at line 7 from Buffer A, 512 to Disk P 518 in FIG. 5A, and as indicated at a block 550 in FIG. 5B.

In step 8, Clear footprint is performed by HW engine 505 writing zeros at control block F8 of chain 520, at line 8 from HW engine 505 to NVRAM 508 and the DS 510 on the local controller 100A and clear footprint on the remote controller 100B at line 8 from HW engine 505 to DS 504 and NVRAM 506 in FIG. 5A, and as indicated at a block 552 in FIG. 5B. In step 9, A and B lists for Buffer A, 512, and Buffer B, 514 are deallocated or depopulated at control block D9 of chain 520, at CS local 502 in FIG. 5A, and as indicated at a block 554 in FIG. 5B. In step 10, Send mirrored delete for cache by HW engine 505 writing zeros to clear CL on local DS 510 and to clear CL on remote DS 504 at control block M10 of chain 520, indicated at line 10 from HW engine 505 to local DS 510 and to remote DS 504 in FIG. 5A, and as indicated at a block 556 in FIG. 5B. In step 11, Page lists for Buffer C, 516 are de-allocated or depopulated at control block D11 of chain 520, at CS local 502 in FIG. 5A, and as indicated at a block 558 in FIG. 5B.

Figure 6B:
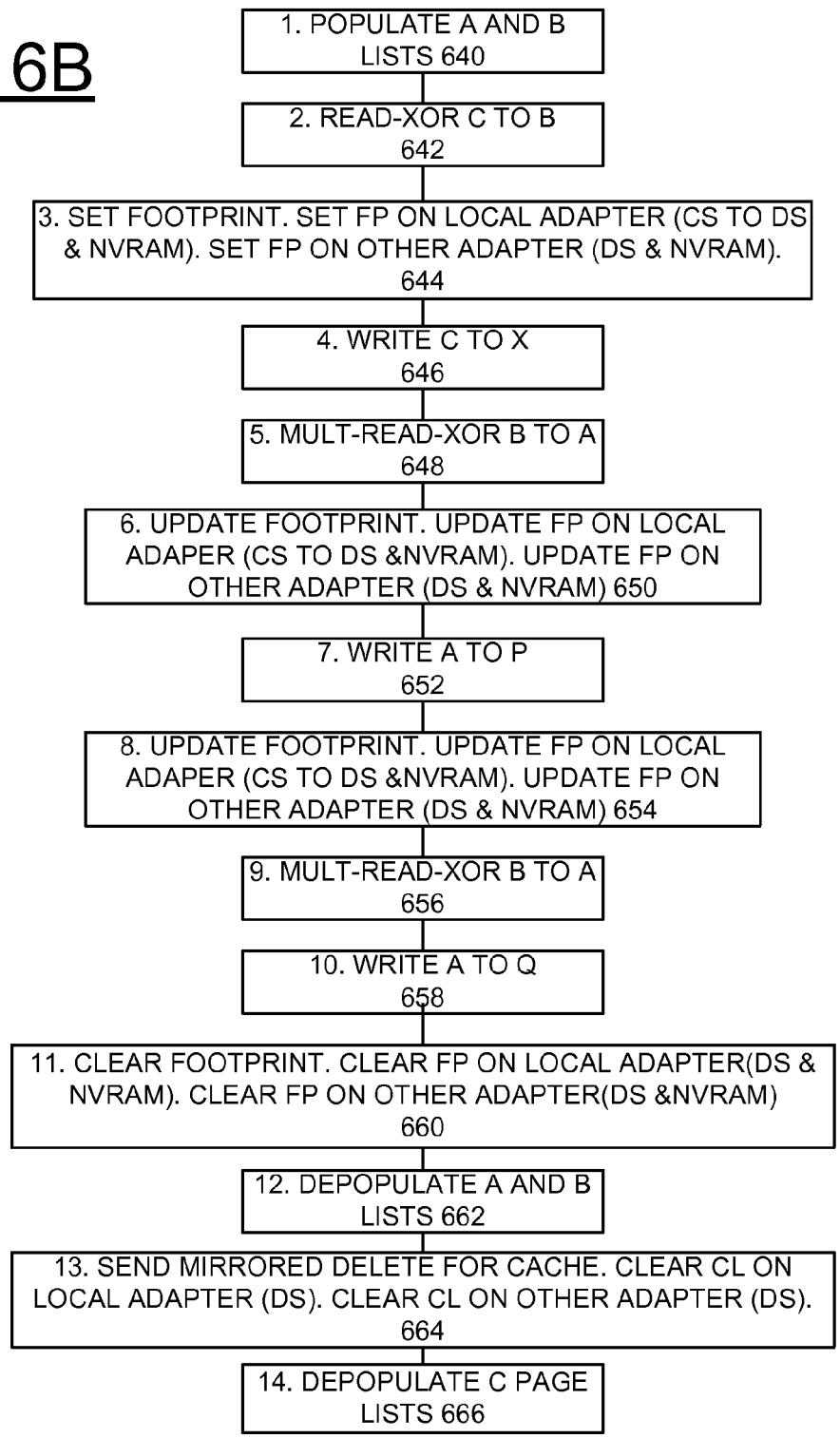

Referring to FIGS. 6A and 6B, there are shown hardware logic operations flow generally designated by the reference character 600 and a flow chart in FIG. 6B illustrating exemplary operations performed by a predefined chain generally designated by the reference character 630 of a plurality of the control blocks selectively arranged to implement an example RAID-6 normal parity update in accordance with the preferred embodiment. In FIG. 6A, the chain 630 of control block 308 include control blocks A1, S2, F3, S4, S5, S6, S7, F8, S9, S10, F11, D12, M13, and D14, as defined in FIG. 4B together with the respective steps 1-14 shown in FIGS. 6A and 6B.

FIG. 6A includes a local CS 602 of a first or local controller 100A coupled by a hardware engine 605 to a remote DS 604 and to a remote NVRAM 606 of a second or remote controller 100B. The local CS 602 is coupled by the hardware engine 605 to a local NVRAM 608, and a local DS 610 of the first controller 100A. A plurality of buffers of a first controller 100A including buffer A, 612, buffer B, 614, and buffer C, 616, are coupled to a disk P 618, a disk X 620 and a disk Q 622.

In step 1, A and B lists for Buffer A, 612, and Buffer B, 614 are allocated or populated at control block A1 of chain 630, in CS local 602 in FIG. 6A, and as indicated at a block 640 in FIG. 6B. Next in Step 2, Data is read from Disk X 620, and XORed with Buffer C, 616 and the result is placed in Buffer B, 614 at control block S2 of chain 630, at 2 XOR in FIG. 6A, and as indicated at a block 642 in FIG. 6B. In step 3, set footprint is performed at control block F3 of chain 630, read by HW engine 605, line 3 from HW engine 605 to DS 610 and NVRAM 608 on the local controller 100A and set footprint on the remote controller 100B from HW engine 605 to DS 604 and NVRAM 606 in FIG. 6A, and as indicated at a block 644 in FIG. 6B.

In step 4, Write data from Buffer C, 616 to Disk X 630 is performed control block S4 of chain 630, line 4 from Buffer C, 616 to Disk X 630 in FIG. 6A, and as indicated at a block 646 in FIG. 6B. Next in Step 5, Data is read from Disk P 618, and XORed with multiplied data from Buffer B, 614 and the result is placed in Buffer A, 612 at control block S5 of chain 630, at 5 XOR in FIG. 6A, and Multiply-Read-XOR B to A as indicated at a block 648 in FIG. 6B. In step 6, update footprint is performed at control block F6 of chain 630, read by HW engine 605, line 6 from HW engine 605 to DS 610 and NVRAM 608 on the local controller 100A and update footprint on the remote controller 100B line 6 from HW engine 605 to DS 604 and NVRAM 606 in FIG. 6A, and as indicated at a block 650 in FIG. 6B.

Next in Step 7, Write data from Buffer A, 612 to Disk P 618 is performed at control block S7 of chain 630, at line 7 from Buffer A, 612 to Disk P 618 in FIG. 6A, and as indicated at a block 652 in FIG. 6B. In step 8, update footprint is performed at control block F8 of chain 630, read by HW engine 605, line 8 from HW engine 605 to DS 610 and NVRAM 608 on the local controller 100A and update footprint on the remote controller 100B line 8 from HW engine 605 to remote DS 604 and remote NVRAM 606 in FIG. 6A, and as indicated at a block 654 in FIG. 6B. Next in Step 9, Data is read from Disk Q 622, and XORed with multiplied data from Buffer B, 614 and the result is placed in Buffer A, 612 at control block S9 of chain 630, at 9 XOR in FIG. 6A, and Multiply-Read-XOR B to A as indicated at a block 656 in FIG. 6B. In step 10, Write data from Buffer A, 612 to Disk Q 622 is performed at control block S10 of chain 630, at line 10 from Buffer A, 612 to Disk Q 622 in FIG. 6A, and as indicated at a block 658 in FIG. 5B.

In step 11, Clear footprint is performed at control block F11 of chain 630, zeros written by HW engine 605, at line 11 from HW engine 605 to DS 610 and NVRAM 608 on the local controller 100A and clear footprint on the remote controller 100B at line 11 from HW engine 605 to remote DS 604 and remote NVRAM 606 in FIG. 6A, and as indicated at a block 660 in FIG. 6B. In step 12, A and B lists for Buffer A, 612, and Buffer B, 614 are deallocated or depopulated at control block D12 of chain 630, in CS local 602 in FIG. 6A, and as indicated at a block 662 in FIG. 6B. In step 13, Send mirrored delete for cache by HW engine 605 writing zeros to clear CL on local DS 610 and to clear CL on remote DS 604 at control block M13 of chain 630, at line 13 from HW engine 605 to local DS 610 and to remote DS 604 in FIG. 6A, and as indicated at a block 664 in FIG. 6B. In step 14, Page lists for Buffer C, 616 are de-allocated or depopulated at control block D14 of chain 630, at DS local 610 in FIG. 6A, and as indicated at a block 666 in FIG. 6B.

Figure 7B:
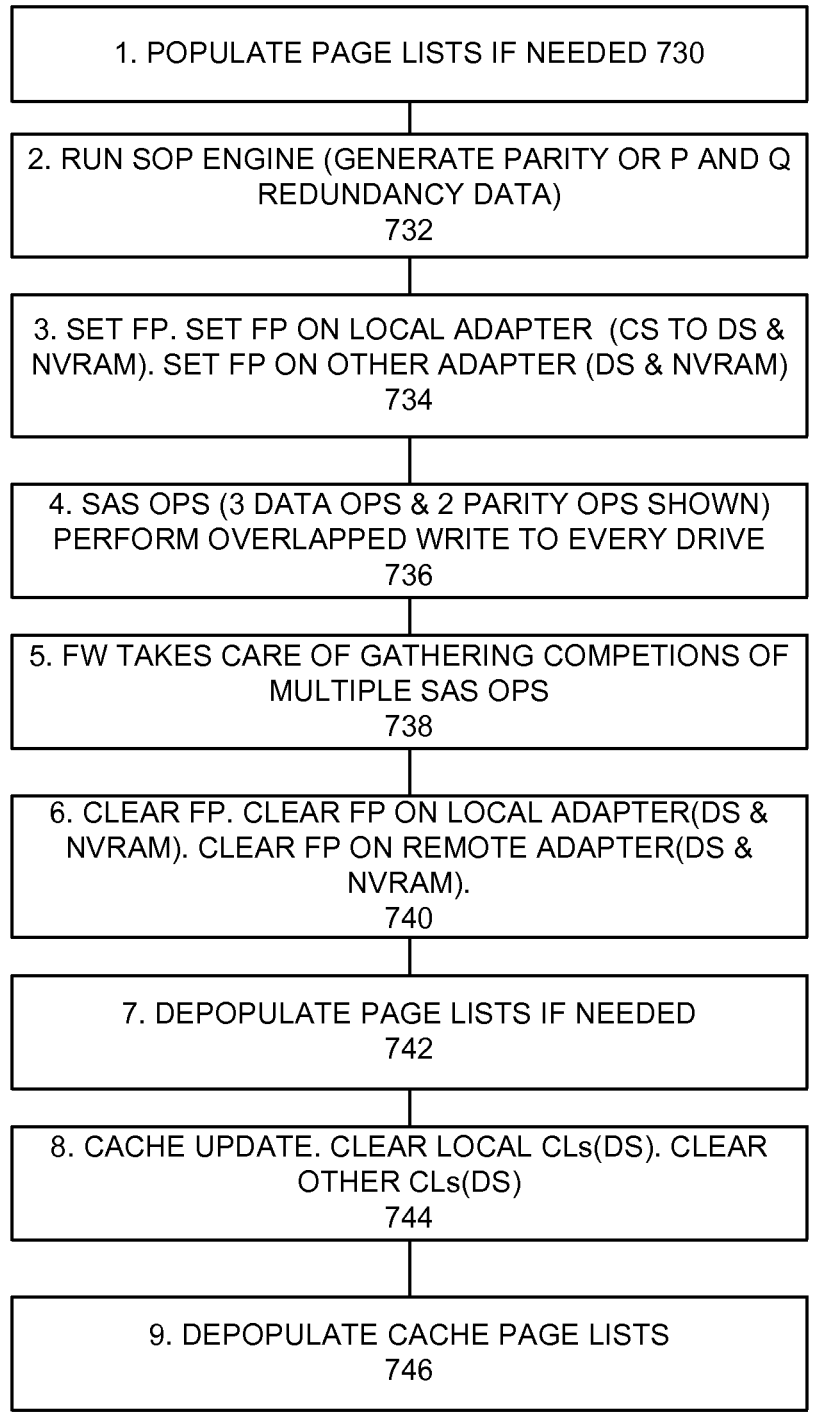

Referring to FIGS. 7A and 7B, there are shown hardware logic operations flow generally designated by the reference character 700 and a flow chart in FIG. 7B illustrating exemplary operations performed by a predefined chain pair 720 of a plurality of the control blocks selectively arranged to implement an example RAID-5/6 stripe write with cache in accordance with the preferred embodiment. In FIG. 7A, the chain pair 720 of control block 308 include control blocks A1, X2, F3, S4, and control blocks F6, D7, M8, and D9, separated by an interaction of firmware (FW) 5, with the control blocks 308 as defined in FIG. 4B together with the respective steps 1-9 shown in FIGS. 7A and 7B.

FIG. 7A includes a local CS 702 of a first or local controller 100A coupled by a hardware engine 705 to a remote DS 704 and to a remote NVRAM 706 of a second or remote controller 100B. The local CS 702 is coupled by the HW engine 705 to a local NVRAM 708, and to a local DS 710 of the first controller 100A. Cache Data 712 of the first controller are coupled to a plurality of Drives 714 and a sum of products (SOP) engine 716 coupled by Parity Buffers 718 to a pair of the Drives 714. For RAID-6, there are two Parity Buffers 718 and two Drives 714, while for RAID-5, one Parity Buffer 718 and one Drive 714 can be used.

In step 1, Page lists are allocated or populated if needed at control block A1 of chain pair 720, at CS local 702 in FIG. 7A, and as indicated at a block 730 in FIG. 7B. Next in Step 2, Run SOP engine 716 is performed generating parity or P and Q redundancy data at control block X2 of chain pair 720, at 2 SOP 716 in FIG. 7A, and as indicated at a block 732 in FIG. 7B.

In step 3, set footprint is performed at control block F3 of chain pair 720, read by HW engine 705, line 3 from HW engine 705 to DS 710 and NVRAM 708 on the local controller 100A and set footprint on the remote controller 100B line 3 from HW engine 705 to remote DS 704 and NVRAM 706 in FIG. 7A, and as indicated at a block 734 in FIG. 7B.

In step 4, performing overlapped Write data to multiple Drives 714 is provided as indicated at multiple parallel control blocks S4 of chain pair 720, lines 4 from Cache Data 712 to multiple Drives 714 in FIG. 7A, and as indicated at a block 736 in FIG. 7B. Firmware optionally takes care of gathering completions of the multiple SAS ops as indicated at a block FW 5 between the chain pair 720, and as indicated at a block 738 in FIG. 7B. The firmware operation at FW 5 could be implemented with another hardware engine 120.

In step 6, Clear footprint is performed writing zeros by HW engine 705 at control block F6 of chain 720, at line 6 from HW engine 705 to DS 710 and NVRAM 708 on the local controller 100A and clear footprint on the remote controller 100B at line 6 from HW engine 705 to remote DS 704 and remote NVRAM 706 in FIG. 7A, and as indicated at a block 740 in FIG. 7B. In step 7, Page lists are de-allocated or depopulated if needed at control block D7 of chain 720, at CS local 702 in FIG. 7A, and as indicated at a block 742 in FIG. 7B. In step 8, Cache update to clear CL writing zeros by hardware engine 705 on local DS 710 and to clear CL on remote DS 704 at control block M8 of chain pair 720, at line 8 from hardware engine 705 to local DS 710 and to remote DS 704 in FIG. 7A, and as indicated at a block 744 in FIG. 7B. In step 9, Cache page lists are de-allocated or depopulated at control block D9 of chain pair 720, at DS local 710 in FIG. 7A, and as indicated at a block 746 in FIG. 7B.

Figure 8A:
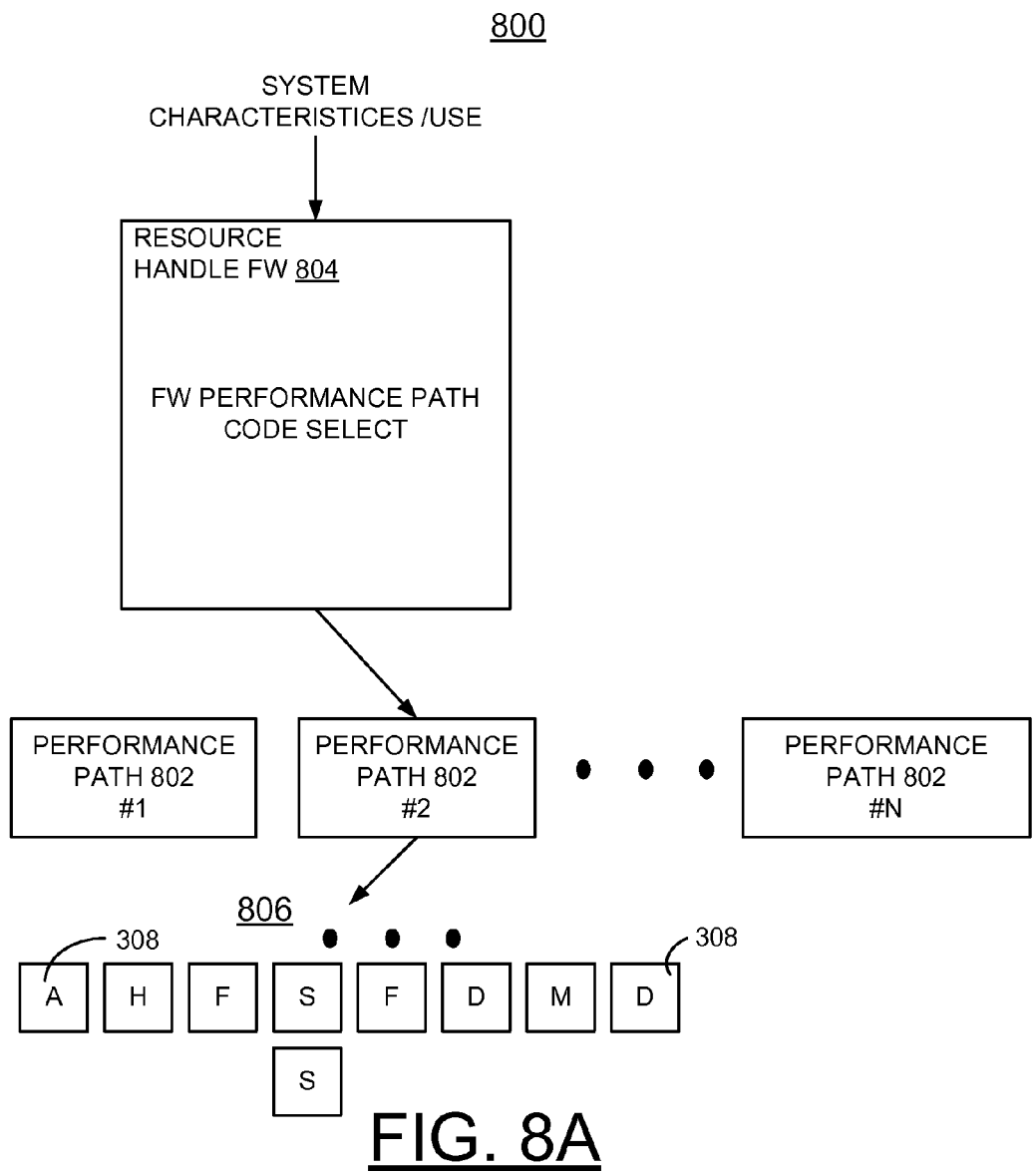
FIGS. 8A and 8B are hardware logic operations flow and flow chart illustrating exemplary operations for organizing code into a performance path in accordance with the preferred embodiment.
Figure 8B:
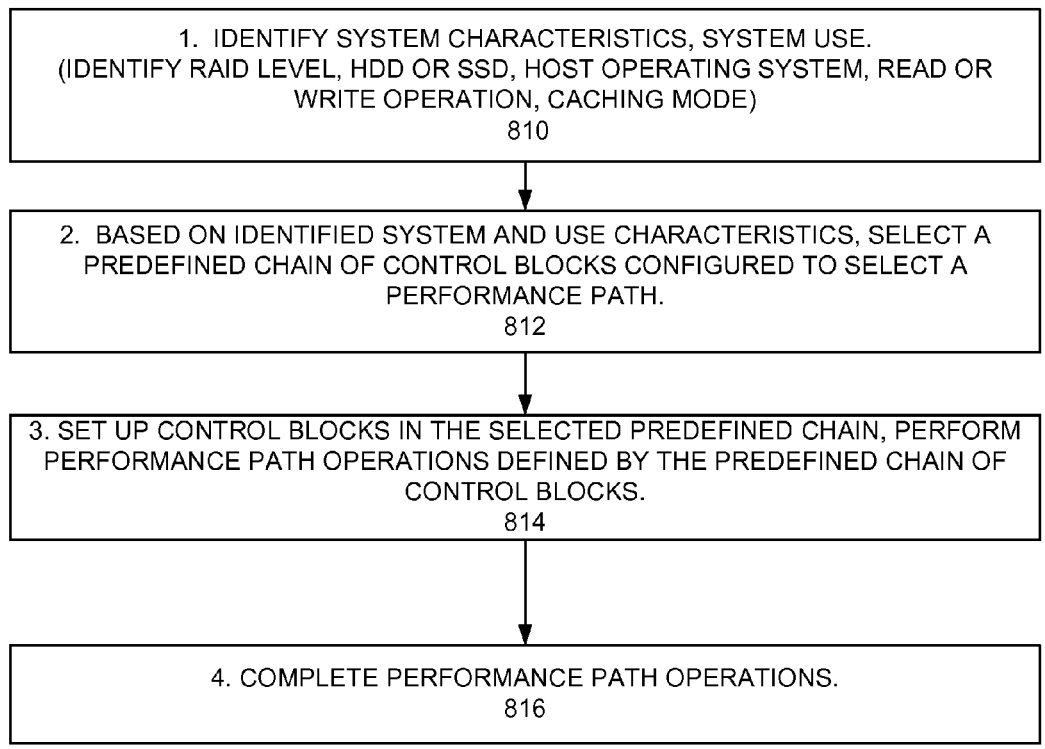

FIGS. 8A and 8B are hardware logic operations flow generally designated by the reference character 800 and flow chart in FIG. 8B illustrating exemplary operations for organizing code into a performance path in accordance with the preferred embodiment.

Hardware logic operations flow 800 of FIG. 8A includes a plurality of unique performance paths 802, #1-N. Each of the unique performance paths 802, #1-N is specific to particular system characteristics including, for example, a particular RAID level, a particular host operating system (OS), and a particular caching mode. The unique performance paths 802, #1-N significantly reduce the code path length to perform a RAID read or write operation while utilizing Write Cache and Dual Controller configurations. The unique performance paths 802, #1-N effectively redesign FW to execute using these special performance paths when no errors, or other exceptional conditions, are occurring. The unique performance paths 802, #1-N allows the FW path length to be as short as possible during normal operation.

For example, respective unique performance paths 802, #1-N are provided for 1) Write Caching, Read miss, RAID-5, HDD, (IBM OS); 2) Write Caching, Destage, RAID-10 (non-IBM OS); 3) Not Write Caching, Read RAID-6, SSD, (non-IBM OS); and 4) Not Write Caching, Write RAID-10, (non-IBM OS).

A firmware (FW) 804, such as a resource handle structure is configured to select a predefined chain based upon a particular characteristic of the system, each predefined chain configured to select a particular performance path to maximize performance. Each of the unique performance paths 802, #1-N includes a corresponding predefined chain, such as chain 806 of a plurality of control blocks 308 shown in FIG. 8A.

Referring also to FIG. 8B, as indicated at a block 810 system characteristics and system use are identified by FW 804, such as identifying the RAID level, HDD or SSD, host operating system, read or write operation, and caching mode. Based upon identified system and use characteristics, a predefined chain of control blocks configured to implement a performance path is selected as indicated at a block 812. As indicated at a block 814, control blocks are set up in the selected predefined chain, and the performance path operations defined by the predefined chain of control blocks are performed. Performance path operations are completed as indicated at a block 816.

Figure 8C:
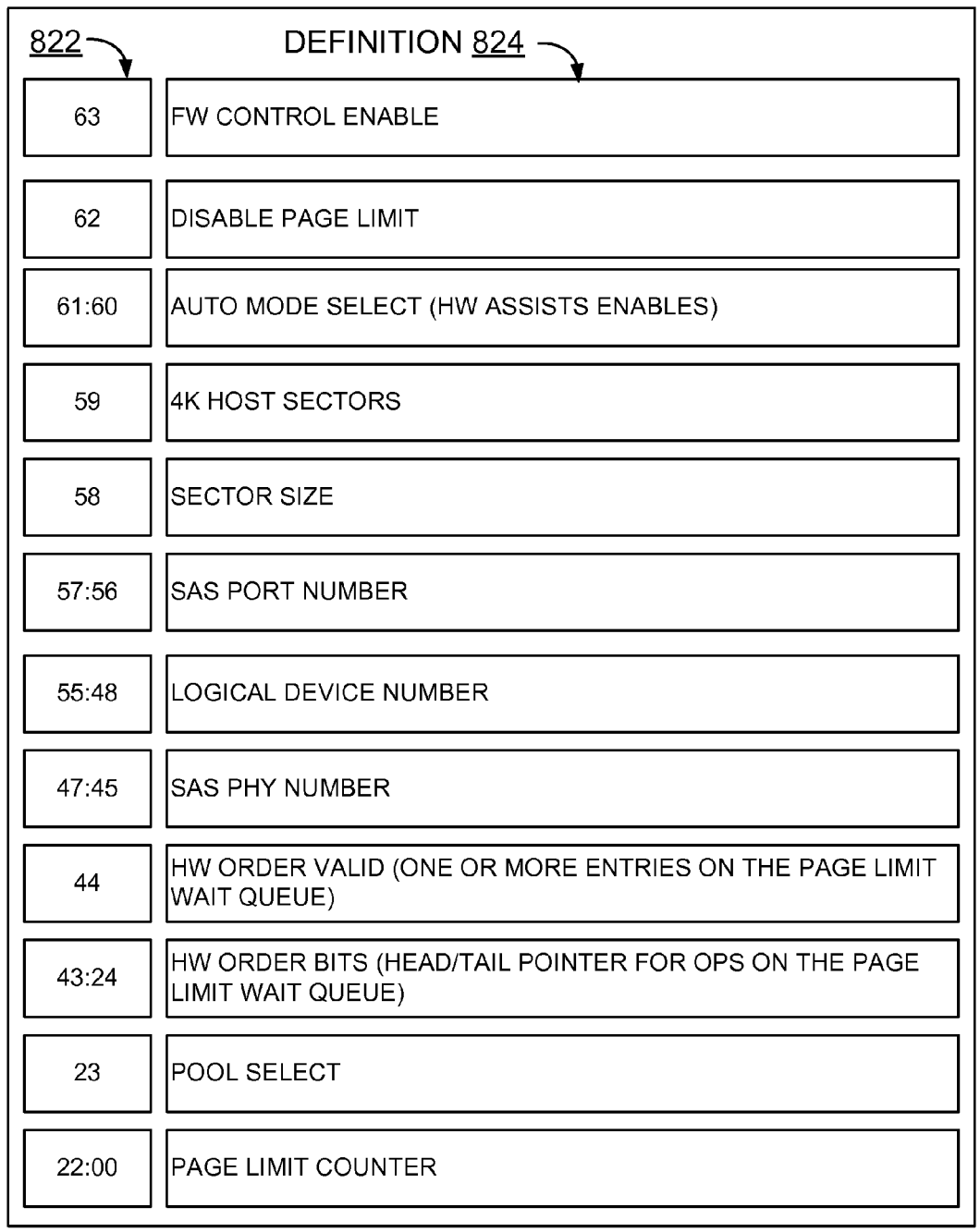
FIG. 8C illustrates an example Resource Handle (RH) in accordance with the preferred embodiment.

FIG. 8C illustrates an example Resource Handle (RH) generally designated by the reference character 820 in accordance with the preferred embodiment. Resource Handle 820 includes predefined bits generally designated by the reference character 822 together with a definition generally designated by the reference character 824 as listed in the following Resource Handle Definition Table:

| | Resource Handle DefinitionTable |
|---|---|
| 63 | FW Control Enable |
| 62 | Disable Page Limit |
| 61:60 | Auto Mode Select (HW assist enables) |
| 59 | 4K host sectors |
| 58 | Sector size |
| 57:56 | SAS Port Number |
| 55:48 | Logical Device Number |
| 47:45 | SAS Phy Number |
| 44 | HW Order Valid (one or more entries on the Page Limit Wait Queue) |
| 43:24 | HW Order Bits (Head/Tail pointer for ops on the Page Limit Wait Queue) |
| 23 | Pool Select |
| 22:00 | Page Limit Counter |

Figure 9:
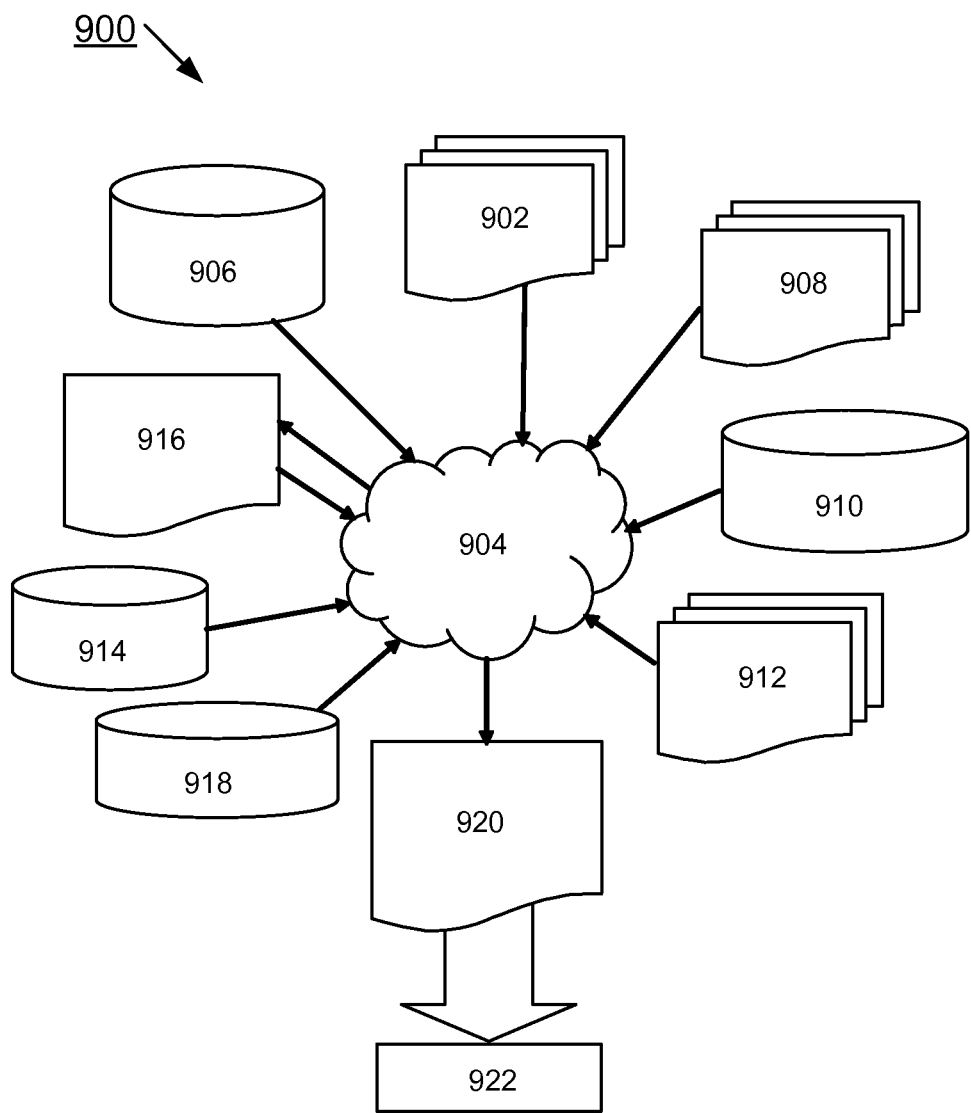
FIG. 9 is a flow diagram of a design process used in semiconductor design, manufacturing, and/or test.

FIG. 9 shows a block diagram of an example design flow 900. Design flow 900 may vary depending on the type of IC being designed. For example, a design flow 900 for building an application specific IC (ASIC) may differ from a design flow 900 for designing a standard component. Design structure 902 is preferably an input to a design process 904 and may come from an IP provider, a core developer, or other design company or may be generated by the operator of the design flow, or from other sources. Design structure 902 comprises circuits 100, 200, 300, 308, 350, 400, 500, 600, 700, 800 in the form of schematics or HDL, a hardware-description language, for example, Verilog, VHDL, C, and the like. Design structure 902 may be contained on one or more machine readable medium. For example, design structure 902 may be a text file or a graphical representation of circuits 100, 200, 300, 308, 350, 400, 500, 600, 700, 800. Design process 904 preferably synthesizes, or translates, circuit 100 into a netlist 906, where netlist 906 is, for example, a list of wires, transistors, logic gates, control circuits, I/O, models, etc. that describes the connections to other elements and circuits in an integrated circuit design and recorded on at least one of machine readable medium. This may be an iterative process in which netlist 906 is resynthesized one or more times depending on design specifications and parameters for the circuit.

Design process 904 may include using a variety of inputs; for example, inputs from library elements 908 which may house a set of commonly used elements, circuits, and devices, including models, layouts, and symbolic representations, for a given manufacturing technology, such as different technology nodes, 32 nm, 45 nm, 90 nm, and the like, design specifications 910, characterization data 912, verification data 914, design rules 916, and test data files 918, which may include test patterns and other testing information. Design process 904 may further include, for example, standard circuit design processes such as timing analysis, verification, design rule checking, place and route operations, and the like. One of ordinary skill in the art of integrated circuit design can appreciate the extent of possible electronic design automation tools and applications used in design process 904 without deviating from the scope and spirit of the invention. The design structure of the invention is not limited to any specific design flow.

Design process 904 preferably translates an embodiment of the invention as shown in FIGS. 1, 2A, 3A, 3B, 4A, 4B, 5A, 5B, 6A, 6B, 7A 7B, 8A, 8B and 8C along with any additional integrated circuit design or data (if applicable), into a second design structure 920. Design structure 920 resides on a storage medium in a data format used for the exchange of layout data of integrated circuits, for example, information stored in a GDSII (GDS2), GL1, OASIS, or any other suitable format for storing such design structures. Design structure 920 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1, 2A, 3A, 3B, 4A, 4B, 5A, 5B, 6A, 6B, 7A, 7B, 8A, 8B and 8C. Design structure 920 may then proceed to a stage 922 where, for example, design structure 920 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A data storage system comprising:
a controller comprising
a plurality of hardware engines;
a data store configured to store a plurality of control blocks selectively arranged in one of a plurality of predefined chains, each control block designed to control a hardware operation in one of the plurality of hardware engines; each said predefined chain defining a sequence of operations; said control blocks being selectively linked to a plurality of other control blocks, providing parallel dispatch of controls applied to respective hardware engines running on different steps for the same function;
a resource handle structure configured to select one said predefined chain based upon a particular characteristic of the system, each said predefined chain configured to minimize hardware and firmware interaction and to implement a particular performance path to maximize performance; and a plurality of said performance paths implementing a plurality of predefined redundant array of inexpensive drives (RAID) functions including RAID read and RAID write operations utilizing write cache and dual controller configurations.

2. The data storage system as recited in claim 1, wherein said resource handle structure selection of one said predefined chain is based upon a plurality of characteristics of a host system and storage devices.

3. The data storage system as recited in claim 2, wherein said plurality of characteristics of the host system and storage devices include a redundant array of inexpensive drives (RAID) level.

4. The data storage system as recited in claim 2 wherein said plurality of characteristics of the host system and storage devices include a particular data and parity layout to support particular device characteristics.

5. The data storage system as recited in claim 2, wherein said plurality of characteristics of the host system and storage devices include a particular host operating system.

6. The data storage system as recited in claim 2, wherein said plurality of characteristics of the host system and storage devices include a particular caching mode.

7. The data storage system as recited in claim 1, wherein said each said control block is selectively linked to another sequential control block and sequential control blocks stored within contiguous memory in said control store.

8. A method for implementing storage adapter performance optimization in a data storage system comprising:
providing a controller comprising a plurality of hardware engines and a processor;
using said processor, providing a data store configured to store a plurality of control blocks selectively arranged in one of a plurality of predefined chains, each control block designed to control a hardware operation in one of the plurality of hardware engines; each said predefined chain defining a sequence of operations; selectively linking said control blocks to a plurality of other control blocks, providing parallel dispatch of controls applied to respective hardware engines running on different steps for the same function; and
providing a resource handle structure configured to select one said predefined chain based upon a particular characteristic of the system, each said predefined chain configured to minimize hardware and firmware interaction and to implement a particular performance path to maximize performance; and a plurality of said performance paths implementing a plurality of predefined redundant array of inexpensive drives (RAID) functions including RAID read and RAID write operations utilizing write cache and dual controller configurations.

9. The method as recited in claim 8, wherein said resource handle structure selects one said predefined chain based upon a plurality of characteristics of a host system and storage devices.

10. The method as recited in claim 8, wherein said resource handle structure selects one said predefined chain based upon a redundant array of inexpensive drives (RAID) level.

11. The method as recited in claim 8, said resource handle structure selects one said predefined chain based upon a particular data and parity layout to support particular device characteristics.

12. The method as recited in claim 8, said resource handle structure selects one said predefined chain based upon a particular host operating system.

13. The method as recited in claim 8, wherein said resource handle structure selects one said predefined chain based upon a particular caching mode.

14. The method as recited in claim 8, wherein providing a data store configured to store a plurality of control blocks selectively arranged in one of a plurality of predefined chains includes providing said control block selectively linked to another sequential control block and storing sequential control blocks within contiguous memory in said control store.

15. A design structure embodied in a non-transitory machine readable medium used in a design process, the design structure comprising:
a controller circuit tangibly embodied in the non-transitory machine readable medium used in the design process, said controller circuit for implementing storage adapter performance optimization in a data storage system, said controller circuit comprising:
a plurality of hardware engines;

a data store configured to store a plurality of control blocks selectively arranged in one of a plurality of predefined chains, each chain defining a sequence of operations; each control block designed to control a hardware operation in one of the plurality of hardware engines; said control blocks being selectively linked to a plurality of other control blocks, providing parallel dispatch of controls applied to respective hardware engines running on different steps for the same function;

a resource handle structure configured to select one said predefined chain based upon a particular characteristic of the system, each said predefined chain configured to minimize hardware and firmware interaction and to implement a particular performance path to maximize performance, and a plurality of said performance paths implementing a plurality of predefined redundant array of inexpensive drives (RAID) functions including RAID read and RAID write operations utilizing write cache and dual controller configurations, wherein the design structure, when read and used in the manufacture of a semiconductor chip produces a chip comprising said controller circuit.

16. The design structure of claim 15, wherein the design structure comprises a non-transitory netlist, which describes said controller circuit.

17. The design structure of claim 15, wherein the design structure resides on the non-transitory machine readable medium as a data format used for the exchange of layout data of integrated circuits.

18. The design structure of claim 15, wherein the design structure resides on the non-transitory machine readable medium and includes at least one of test data files, characterization data, verification data, or design specifications.

* * * * *